United States Patent [19]
Doherty

[11] Patent Number: 5,119,752
[45] Date of Patent: Jun. 9, 1992

[54] TRAILER FOR PERSONAL MOTORCRAFT

[76] Inventor: Mark Doherty, 4021 Lamont St., #9, San Diego, Calif. 92109

[21] Appl. No.: 649,741

[22] Filed: Feb. 1, 1991

[51] Int. Cl.[5] .............................................. B63B 38/00
[52] U.S. Cl. ................................ 114/270; 114/361; 180/190; 280/24
[58] Field of Search ............... 114/270, 249, 250, 357, 114/361, 353, 344; 180/190; 280/24; 441/65

[56] References Cited

U.S. PATENT DOCUMENTS

| | | | |
|---|---|---|---|
| 2,570,528 | 10/1951 | Davis | 114/353 X |
| 3,090,973 | 5/1963 | Levinson | 114/353 X |
| 3,380,090 | 4/1968 | Kenmuir | 114/357 |
| 3,383,720 | 5/1968 | Greig et al. | 114/357 |
| 3,684,139 | 8/1972 | Johnson | 114/353 |
| 3,831,208 | 8/1974 | Smith | 114/361 |
| 4,395,185 | 7/1983 | Whaley | 114/344 X |

FOREIGN PATENT DOCUMENTS 43889  2/1988  Japan ................................. 114/250

OTHER PUBLICATIONS

Johnson Skee-Horse Snowmobiles for 68, Johnson Motors, Waukegan, Ill.
Sno-Lorry, NeArctic Industries, Inc., North St. Paul, Minn., May 1971.

Primary Examiner—Sherman D. Basinger
Attorney, Agent, or Firm—Brown, Martin, Haller & McClain

[57] ABSTRACT

The personal motorcraft trailer has a lower shell which is capable of flotation and planing on a body of water. An upper shell has a lip which fits over the edge of the lower shell forming a sealed pod in which gear and supplies may be stored. At least a portion of the upper shell is openably attached by a hinge. The upper shell has two recessed areas in its upper surface, the rear recessed area being deep enough for holding fuel containers and the forward recessed area being relatively shallow and concave to accept gear such as surfboards or skis which are held in place by elastic cords stretched across the gear from hooks on the sides of the upper shell. The trailer is towed behind the motorcraft by a tongue the prongs of which attach at two clips, one on either side of the lower shell. Each prong of the tongue catches under the lip at the front of the trailer to prevent the trailer from digging into the water, causing it to flip. The shells of the trailer are molded of lightweight plastic or similar polymer to make the trailer easy to lift and transport. In an alternate embodiment for use with snowmobiles, the same structure as above is fitted with skis or rails on its bottom surface to permit the trailer to move smoothly through snow or on ice.

19 Claims, 3 Drawing Sheets

TRAILER FOR PERSONAL MOTORCRAFT

BACKGROUND OF THE INVENTION

Recently, personal watercraft have achieved substantial popularity for recreational activities including pleasure boating and waterskiing. The ready portability and storability of these personal watercraft, and relatively economical price, put them within reach of potential users who previously had no place to store, or could not afford, a fullsize boat. The watercraft's small size permits the user to transport the craft to the water's edge in a pickup truck or small trailer, then carry the watercraft to the water. The compact size of the watercraft is a disadvantage, however, when the user wants to transport sports or camping gear to a less-inhabited area, or when the distance to be traveled is greater than that permitted by the fuel capacity of the craft's tank. The watercraft has no storage provision with the exception of commercially available saddlebags, which still have a very limited capacity.

With the increasing popularity of personal watercraft, it is anticipated that they will be used for a wider variety of activities beyond pleasure boating and waterskiing, where the activity is done primarily in the immediate area of the dropoff point. The personal watercraft may be used for numerous activities including traveling to campsites at locations of lakes or rivers remote from parking, transporting scuba gear to dive spots, traveling to fishing spots away from crowds, getting away to remote water ski or surfing areas, and just traveling to an isolated spot for a day at the beach, river or lake.

Similar to personal watercraft are snowmobiles which are restricted in their range of travel due to limited fuel capacity, and which have limited storage provision for carrying gear such as skis, snow shoes, camping and hunting equipment and extra fuel.

It would be desirable to provide an apparatus and method for transporting gear to permit the user of a personal motorcraft to venture away from the vehicle in which they arrived. It is to this object that the present invention is directed.

SUMMARY OF THE INVENTION

It is an advantage of the present invention to provide a trailer for transporting gear and supplies while using a personal watercraft.

It is a further advantage of the present invention to provide a trailer which is lightweight for easy transport and handling.

It is still another advantage of the present invention to provide a fully functional trailer which maintains the same sleek, streamlined appearance and hydrodynamic performance as that of the personal watercraft.

Another advantage of the present invention is to provide a trailer which is adaptable for towing behind other recreational personal motorcraft such as snowmobiles.

In an exemplary embodiment, the personal motorcraft trailer has a lower shell which is capable of flotation and planing on a body of water. An upper shell has a lip which fits over the edge of the lower shell forming a sealed pod in which gear and supplies may be stored. The sealed pod may be opened by providing a hinge at either the rear of the pod so that the entire upper shell is lifted or at some intermediate location so that only a portion of the upper shell opens. The upper shell has two recessed areas in its upper surface, the rear recessed area being deep enough for holding fuel containers and the forward recessed area being relatively shallow and concave to accept gear such as surfboards or skis which are held in place by elastic cords stretched across the gear from hooks on the sides of the upper shell. The trailer is towed behind the motorcraft by a tongue, the prongs of which attach at two clips, one on either side of the lower shell. Each prong of the tongue catches under the lip at the front of the trailer to prevent the trailer from digging into the water, causing it to flip. The shells of the trailer are molded of lightweight plastic or similar polymer to make the trailer easy to lift and transport, and to make the appearance of the trailer hydrodynamic and streamlined, similar to the sleek appearance of the personal watercraft pulling it.

In an alternate embodiment for use with snowmobiles, the same structure as above is fitted with skis or rails on its bottom surface to permit the trailer to move smoothly through snow or on ice. Shock absorption may be provided by placing leaf springs or a similar resilient mounting means between the trailer body and the skis or rails.

BRIEF DESCRIPTION OF THE DRAWINGS

Understanding of the present invention will be facilitated by consideration of the following detailed description of a preferred embodiment of the present invention, taken in conjunction with the accompanying drawings, in which like reference numerals refer to like parts and in which.

DETAILED DESCRIPTION OF THE PREFERRED EMBODIMENTS

Figure 1:
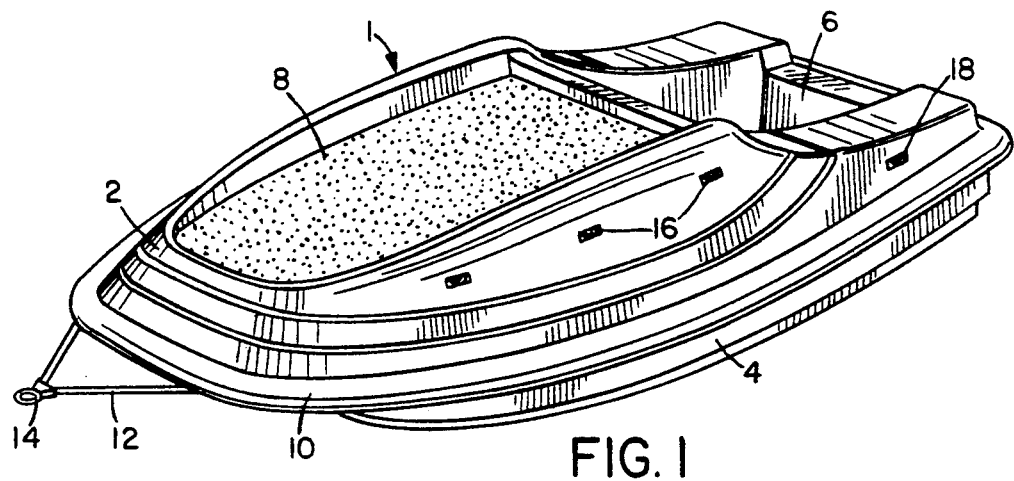
FIG. 1 is a perspective view of the trailer of the present invention.
Figure 2:
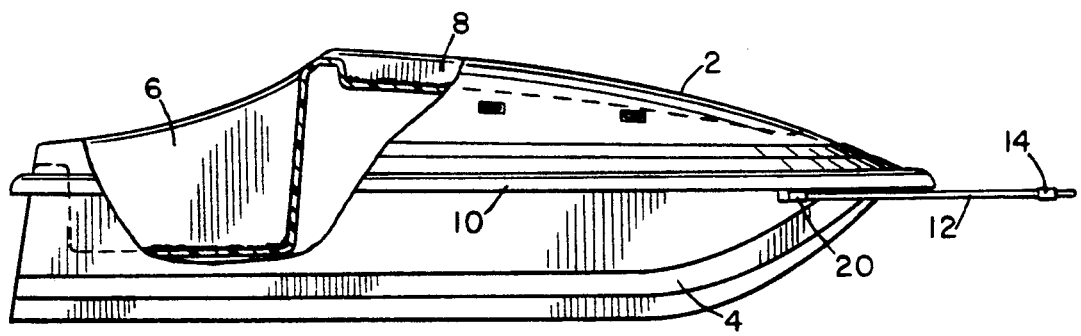
FIG. 2 is a side elevation view, partially cut away.
Figure 4:
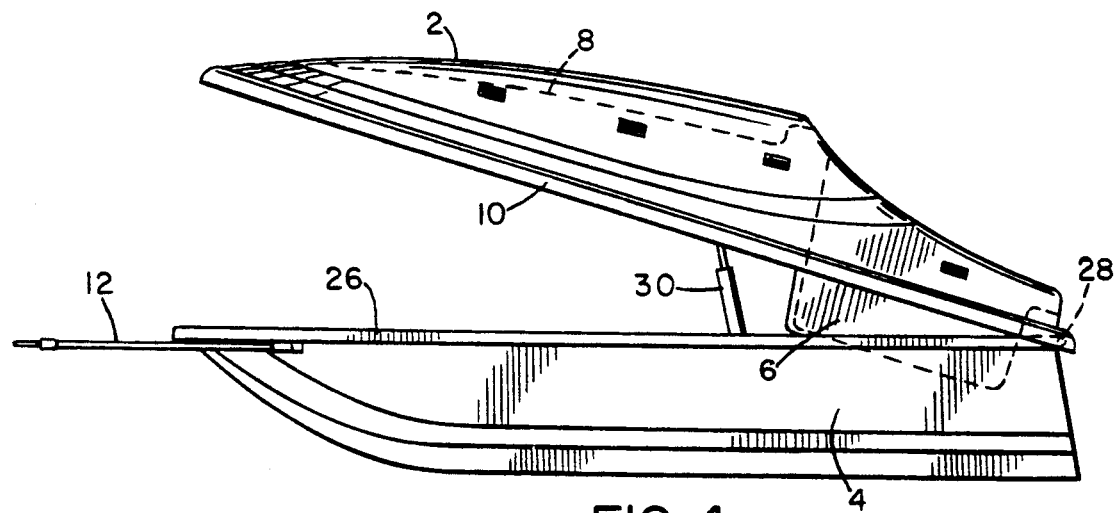
FIG. 4 is a side elevation view of the opened trailer.

As illustrated in FIGS. 1 and 2, the personal watercraft trailer 1 has a molded upper shell 2 and molded lower shell 4 of resilient plastic which are pivotally attached at the rearmost location of trailer 1 by a hinge 28 (shown in FIG. 4). Upper shell 2 has a lip 10 around its perimeter which fits closely over the upper rim of lower shell 4. The trailer 1 is attached to a personal watercraft for towing by tongue 12.

Upper shell 2 is molded as a single piece with recessed areas 6 and 8 formed in the rear and front, respectively. A plurality of ridges are formed during the molding process to improve streamlining and to match the modern appearance of the personal watercraft.

Recessed area 6 is relatively deep, extending into the inside area of lower shell 4. Recessed area 6 is designed for retaining fuel cans or an ice chest, i.e., a generally large, square-shaped article which is too large to be carried inside the trailer 1. This design is especially applicable to carrying one or more fuel containers because it would generally be undesirable to store fuel with other items being carried, which may include clothing, camping gear or food. The articles carried within recessed area 6 may be secured by attaching a rope, net, strap or elastic "bungee" cord to hooks 18 on opposite sides of recessed area 6. The hooks may be a standard eye hook, C-hook or a fairlead. The articles may be further prevented from sliding around within recessed area 6 by attaching a non-skid material such as Sanopad to the bottom of the recess.

Recessed area 8 is a relatively shallow, generally concave area within the front portion of upper shell 2. This area is intended to hold large or long items such as surfboards, water skis or fishing gear which are too large or long to be placed inside the trailer 1, and which are not damaged by exposure to water. The item may be held in place by attaching a rope, net or elastic bungee cord across it and attaching the tie down means to hooks 16 on opposite sides of the recessed area 8, hooks 16 being of the same variety as hooks 18. To prevent sliding, a nonskid material is used to line the bottom of the recessed area.

Lip 10 runs around the entire perimeter of upper shell 2 such that it extends over the upper rim 26 of lower shell 4, sealing the trailer 1. To increase the quality of the seal, a watertight seal is fixed to the upper shell 2 within lip 10.

At the front of the trailer 1 the two legs of tongue 12 are attached at hooks 20 by clips on the ends of the legs. The legs of tongue 12 are preferably metal bars coated with padded vinyl or similar cushioning to avoid marring the trailer. The clips are preferably a locking-type clip with a spring release. The location of hook 20 is such that the legs of tongue 10 catch under lip 10 and upper rim 26, as shown in FIGS. 2 and 4. This placement provides support for the front of the trailer 1 to prevent "pearling", the digging of the front end of the trailer into the water causing the trailer to flip end over end. At the forward end of tongue 12 a hook 14 is provided for attachment to the towing means of the personal watercraft.

As shown in FIG. 4, upper shell 2 and lower shell 4 are pivotally attached by a hinge 28 at the rearmost portion of the trailer. Hinge 28 is preferably made from a corrosionresistant metal and is as long as the width of the back of the trailer so the entire structure is supported when the trailer is open. Forward of the hinge 28 is a pair of gas- or airfilled cylinder supports 30 which safely hold the trailer open when the upper shell 2 is lifted. Other safety supports may be used which lock when lifted then are released in order to lower upper shell 2. One support may be used as well on one side, but two supports are preferred.

Figure 3:
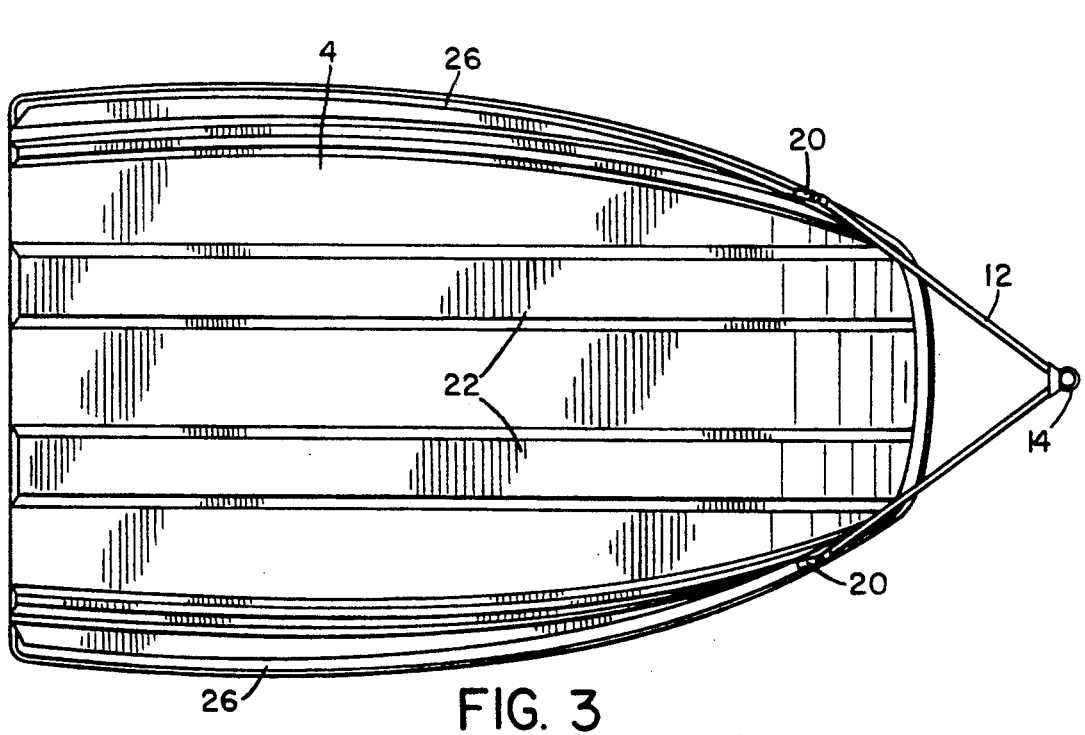
FIG. 3 is a plan view of the bottom surface of the trailer.

As shown in FIG. 3, channels 22 are formed in the bottom surface of lower shell 4. Channels 22 provide additional stability to the trailer by causing a differential force on the planing surface which pulls the trailer down onto the surface of the water.

For storage and transport of assorted gear and supplies, the items which are small enough and which require protection from water are placed inside lower shell 4. The items may be stacked so that the lower shell 4 is completely filled as long as sufficient space remains to allow the upper shell 2 to be fully closed. After upper shell 2 is closed the fuel can may be placed in recessed area 6 and secured, and the larger equipment is placed over recessed area 8 and tied down.

Figure 5:
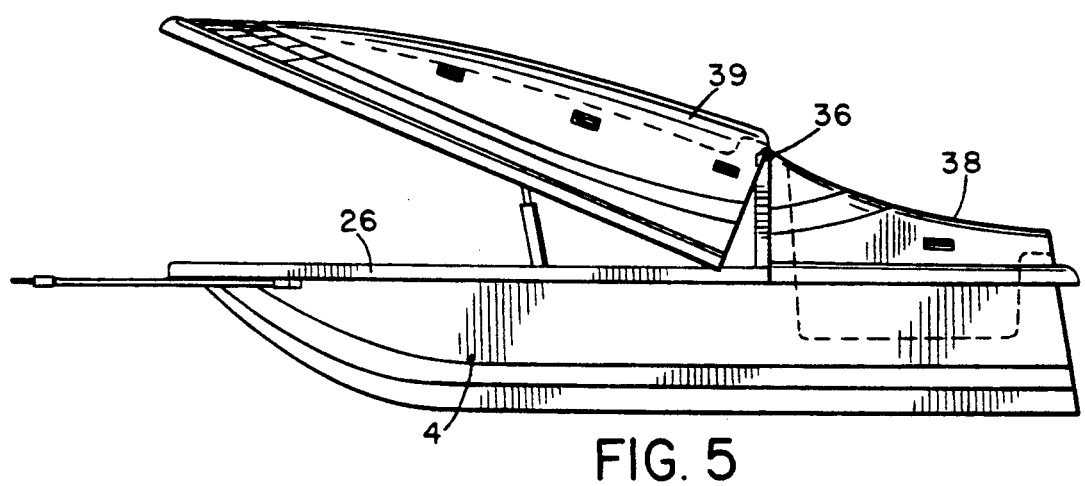
FIG. 5 is a side elevation view of an alternate embodiment.

In a first alternate embodiment shown in FIG. 5, hinge 36 is located forward of recessed area 38 and behind recessed area 39. The front portion of the trailer will be the only openable portion, but it would still be possible to slide items inside of lower shell 4 in areas not filled by recessed area 38. Such an embodiment permits fuel cans to be left in place while loading the remaining gear.

Figure 7:
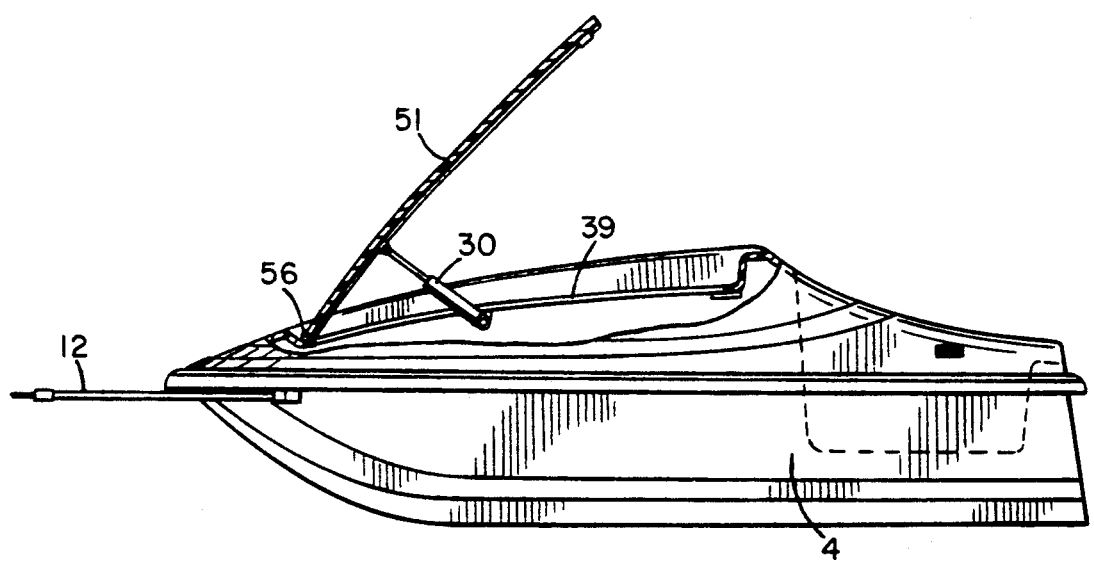
FIG. 7 is a side elevation view, partially cut away, of a second alternate embodiment.

In a second alternate embodiment shown in FIG. 7, hinge 56 is located at the front of recessed area 39 so that only the bottom portion 51 of recessed area 39 opens. This configuration avoids any difficulty encountered in making sure that nothing is placed directly underneath recessed area 36 to prevent closing of the trailer. Items to be stowed can be pushed backward to fill available spaces. A seal will be placed around the openable portion to guard against leakage.

Figure 6:
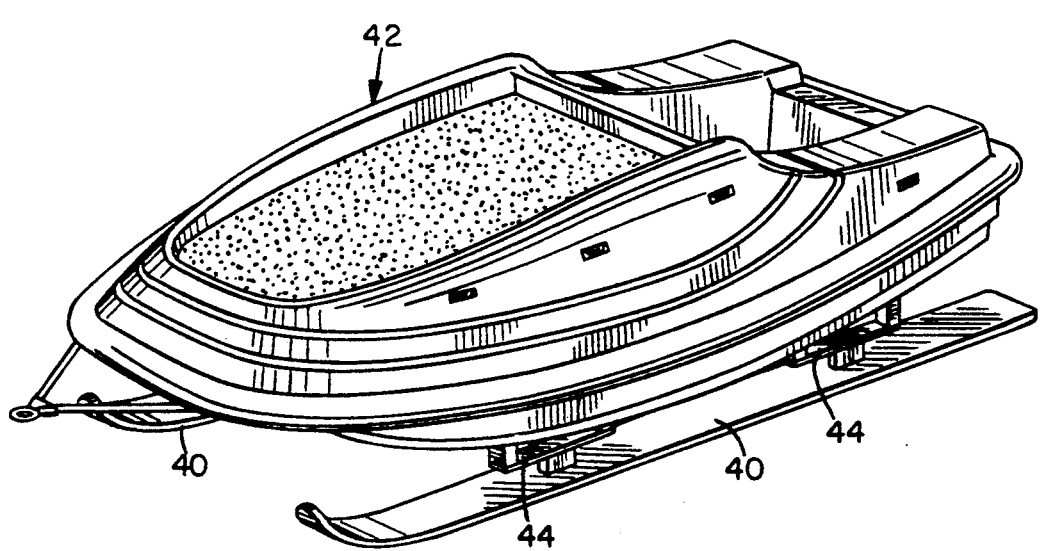
FIG. 6 is a perspective view of a trailer for a snowmobile.

In an embodiment, shown in FIG. 6, the same body of the trailer for personal watercraft can be fitted with skis 40, rails or the like to provide a trailer 42 for use with a snowmobile. Other than the channels of the first embodiment the same basic structure is equally applicable for snowmobile use. For additional stability and shock absorption, leaf springs 44 or other resilient supports may be disposed between skis 40 and the bottom of trailer 42 to decrease bumping and jarring when travelling over rough surfaces.

The personal motorcraft trailer of the present invention provides a convenient way of extending the range and usefulness of a personal motorcraft; either a watercraft or a snowmobile. The molded structure of the design provides moisture and dirt resistance and further, by the use of ridges running along the length of the trailer, provides a streamlined response and appearance which combine well with that of the personal motorcraft.

While the material of which the trailer is made is preferably plastic or a similar polymer which can be molded, the trailer may also be constructed of fiberglass or other resinous materials which can be shaped to achieve the desired configuration.

The personal motorcraft trailer 1 is a safe and stable means for transporting sporting gear, supplies, and even work tools to a location which may be otherwise inaccessible by land vehicle. After use, the trailer can be easily and conveniently stored for transport.

It will be evident that there are additional embodiments which are not illustrated above but which are clearly within the scope and spirit of the present invention. The above description and drawings are therefore intended to be exemplary only and the scope of the invention is to be limited solely by the appended claims.

I claim:

1. A trailer for towing behind a personal motorcraft comprising:
    a lower shell having a generally U-shaped perimeter and having a generally flat bottom surface with an upward curvature at a front end, said lower shell being capable of flotation and planing on a body of water;
    an upper shell formed to mate with said lower shell and having a left side, a right side and- a plurality of recessed areas in an upper surface, at least a portion of said upper shell being openable;
    a hinge to pivotally attach said openable portion of said upper shell to a fixed portion of said trailer;
    a pair of fastening means on said lower shell disposed on opposite sides of said lower shell; and
    a tongue member pivotally attached to said pair of fastening means whereby said trailer may be towed behind said personal motorcraft.

2. A trailer as in claim 1 wherein a first recessed area of said plurality is disposed in a rear portion of said upper shell, said first recessed area having four sides and being sufficiently deep to retain at least one fuel container.

3. A trailer as in claim 2 wherein said hinge is disposed forward of said first recessed area so that said rear portion of said upper shell comprises said fixed portion and said forward portion of said upper shell comprises said openable portion.

4. A trailer as in claim 1 wherein a second recessed area of said plurality is disposed in a forward portion of said upper shell, said second recessed area being generally concave.

5. A trailer as in claim 4 wherein at least a portion of said second recessed area comprises said openable portion.

6. A trailer as in claim 1 wherein a plurality of hooks is attached to said upper shell on said left side and said right side.

7. A trailer as in claim 1 wherein said hinge is disposed at a rearmost portion of said trailer so that said upper shell comprises said openable portion.

8. A trailer as in claim 1 wherein at least one support is attached at one end to said fixed portion and at an opposite end to said openable portion at some distance from said hinge so that said at least one support holds said openable portion open when engaged.

9. A trailer as in claim 1 wherein a watertight seal is disposed between said openable portion and said fixed portion to prevent water from entering said trailer.

10. A trailer as in claim 1 wherein a non-slip surface is disposed within each of said plurality of recessed areas.

11. A trailer as in claim 1 wherein a plurality of skis are fixed in a parallel relationship on a bottom portion of said lower shell.

12. A trailer as in claim 11 wherein a shock-absorbing means is disposed between each of said plurality of skis and said bottom portion.

13. A trailer as in claim 11 wherein said personal motorcraft is a snowmobile.

14. A trailer as in claim 1 wherein said personal motorcraft is a watercraft.

15. A trailer for towing behind a personal watercraft for hauling gear or supplies, said trailer comprising:

a lower shell having a configuration for flotation and planing on the surface of a body of water;

an upper shell mating with said lower shell to form a pod, said upper shell having at least one recessed area wherein a portion of said gear or supplies may be retained and an openable portion providing access to the inside of said pod wherein a second portion of said gear or supplies may be retained; and a means for fastening a towing means to said lower shell whereby said trailer may be towed behind said personal watercraft.

16. A trailer as in claim 15 further comprising a plurality of hooks attached to an outer surface of said pod whereby at least one tie-down means may be attached to said plurality of hooks to retain said gear or supplies in said at least one recessed area.

17. A trailer as in claim 15 wherein a hinge pivotally attaches said openable portion to a fixed portion of said pod.

18. A trailer for towing behind a personal watercraft comprising:

a lower shell having a generally U-shaped perimeter and having a generally flat bottom surface with an upward curvature at a front end, said lower shell being capable of flotation and planing on a body of water;

an upper shell formed to mate with said lower shell and having a left side, a right side and a plurality of recessed areas in an upper surface, at least a portion of said upper shell being openable;

a hinge to pivotally attach said openable portion of said upper shell to a fixed portion of said trailer, said hinge being disposed forward of a first recessed area disposed in a rear portion of said upper shell so that said rear portion of said shell comprises said fixed portion and said forward portion of said upper shell comprises said openable portion;

a pair of fastening means on said lower shell disposed on opposite sides of said lower shell; and a tongue member pivotally attached to said pair of fastening means whereby said trailer may be towed behind said personal motorcraft.

19. A trailer as in claim 18 wherein a second recessed area of said plurality is disposed in a forward portion of said upper shell, said second recessed area being generally concave.

* * * * *

UNITED STATES PATENT AND TRADEMARK OFFICE
CERTIFICATE OF CORRECTION

PATENT NO. : 5,119,752

DATED : June 9, 1992

INVENTOR(S) : Mark Doherty

It is certified that error appears in the above-identified patent and that said Letters Patent is hereby corrected as shown below:

7, Column 6, Line 36, insert --upper-- after "of said".

Signed and Sealed this

Nineteenth Day of October, 1993

Attest:

BRUCE LEHMAN

Attesting Officer  Commissioner of Patents and Trademarks